(12) United States Patent  (10) Patent No.: US 6,574,013 B1
Koshi  (45) Date of Patent: Jun. 3, 2003

(54) FACSIMILE MACHINE WITH PAPER SENSOR FOR STACKER

(75) Inventor: Gen Koshi, Yokohama (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/204,053

(22) Filed: Dec. 3, 1998

(30) Foreign Application Priority Data

Dec. 12, 1997 (JP) .............................................. 9-343186

(51) Int. Cl.⁷ ................................................. H04N 1/00
(52) U.S. Cl. ........................ 358/441; 358/434; 358/468; 271/176; 271/296; 271/227; 347/3; 347/153
(58) Field of Search ................................. 358/441, 434, 358/468; 347/3; 271/176, 227

(56) References Cited

U.S. PATENT DOCUMENTS

| | | | | |
|---|---|---|---|---|
| 3,870,868 A | * | 3/1975 | Jones | |
| 4,694,963 A | * | 9/1987 | Takesako | 209/534 |
| 4,927,131 A | * | 5/1990 | Hashimoto et al. | 271/215 |
| 4,938,467 A | * | 7/1990 | Honjo et al. | 271/202 |
| 5,075,786 A | * | 12/1991 | Ikenoue et al. | 358/449 |
| 5,079,722 A | * | 1/1992 | Ogawa | 395/111 |
| 5,227,894 A | * | 7/1993 | Yoshida | 358/441 |
| 5,328,169 A | * | 7/1994 | Mandel | |
| 5,371,573 A | * | 12/1994 | Kagaya et al. | 399/18 |
| 5,435,544 A | * | 7/1995 | Mandel | |
| 5,541,393 A | * | 7/1996 | Ikezawa et al. | |
| 5,551,686 A | * | 9/1996 | Sanchez et al. | 271/298 |
| 5,813,667 A | * | 9/1998 | Imai et al. | 270/58.14 |
| 5,823,529 A | * | 10/1998 | Mandel et al. | |
| 5,905,520 A | * | 5/1999 | Fujii et al. | 347/153 |
| 5,961,115 A | * | 10/1999 | Blanck et al. | 271/263 |
| 5,963,754 A | * | 10/1999 | Itoh et al. | 399/21 |
| 6,113,094 A | * | 9/2000 | Horiguchi et al. | 271/176 |
| 6,168,145 B1 | * | 1/2001 | Tanaka et al. | 270/58.11 |
| 6,264,189 B1 | * | 7/2001 | Kawata | 271/176 |

FOREIGN PATENT DOCUMENTS

JP    08224922    *  9/1996

* cited by examiner

*Primary Examiner*—Edward Coles
*Assistant Examiner*—Tia Carter
(74) *Attorney, Agent, or Firm*—Rabin & Berdo, P.C.

(57) ABSTRACT

A facsimile machine has a stacker to which printed pages are delivered, and a paper sensor that senses whether the stacker is empty. The facsimile machine clears an internal page count to zero when the stacker is empty, increments the page count as each printed page is delivered, suspends printing when the page count reaches a limit value, and resumes printing when the stacker is emptied. While printing is suspended, facsimile reception may continue in a memory mode.

3 Claims, 5 Drawing Sheets

FACSIMILE MACHINE WITH PAPER SENSOR FOR STACKER

BACKGROUND OF THE INVENTION

The present invention relates to a facsimile machine having a memory unit and a stacker.

Facsimile machines with internal memory units are well known. Small amounts of memory are used for purposes such as transmit and receive buffering, and storing image data while the data are being coded and decoded. Larger internal memories store multiple pages of image data, enabling the image data to be received and printed at different speeds, or at different times, and enabling documents to be scanned and transmitted at different speeds or times.

Facsimile machines that deliver printed pages into a stacker are also well known. The printed pages may have been transmitted from a distant facsimile machine, or they may have been scanned by the facsimile machine itself, in which case the facsimile machine operates as a copier. The printed pages accumulate in the stacker until they are removed manually.

The capacity of the stacker differs from one facsimile machine to another, but in any case, the printed pages should be removed often enough to keep the stacker from becoming full. If the stacker can stack no more than fifty pages, for example, then the printed pages should be removed before fifty pages have been stacked. If the stacker is allowed to become full, then when the next printed page is delivered into the stacker, it jams against the pages that have already been stacked, typically causing a facsimile transmission to fail, and occasionally putting the facsimile machine out of order by damaging the printing mechanism.

SUMMARY OF THE INVENTION

It is accordingly an object of the present invention to avoid paper jams and associated problems that occur when a facsimile machine attempts to deliver printed pages to a full stacker.

Another object of the invention is to enable a facsimile transmission to continue while the stacker is full, and to print the received pages as soon as the stacker is emptied.

Another object is to resume a suspended document copying operation as soon as the stacker is emptied.

The invented method of controlling a facsimile machine comprises the steps of:

counting the printed pages delivered to the stacker;

suspending printing when the page count reaches a limit value;

sensing the presence and absence of printed pages in the stacker; and resuming printing when the stacker is sensed to be empty.

The invented facsimile machine has a memory unit that stores the limit value, a paper sensor that performs the sensing step, and a control unit that performs the other steps.

DETAILED DESCRIPTION OF THE INVENTION

Figure 1:
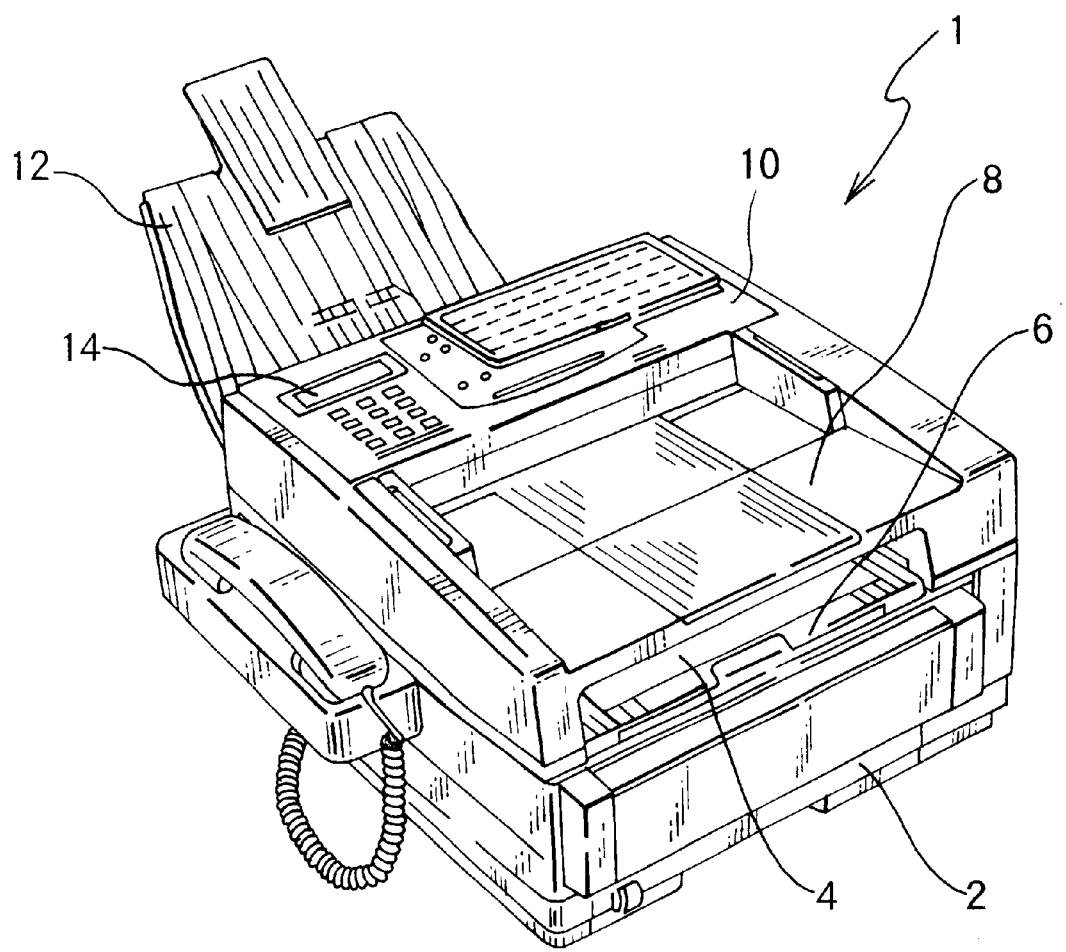
FIG. 1 is a perspective view of a facsimile machine embodying the present invention.

An embodiment of the invention will be described with reference to the attached drawings, in which like parts are indicated by like reference characters.

Referring to FIG. 1, when a facsimile machine 1 embodying the present invention receives a facsimile transmission from another facsimile machine, paper is fed from a cassette 2 to a printing unit (not visible), and printed pages 4 are delivered to a stacker 6. When the facsimile machine 1 transmits a document to another facsimile machine, the document (not visible) is placed on a document table 8, scanned by a scanning unit (not visible) located below a control panel 10, and delivered to a document stacker 12. When the facsimile machine 1 is used to copy a document, the document is placed on the document table 8 and scanned as above, the scanned image is printed on paper from the cassette 2, and the resulting copy of the document is delivered to the stacker 6. The control panel 10 has push-button means for entering facsimile numbers and performing other operations, and a display 14 for displaying facsimile numbers and short messages.

Figure 2:
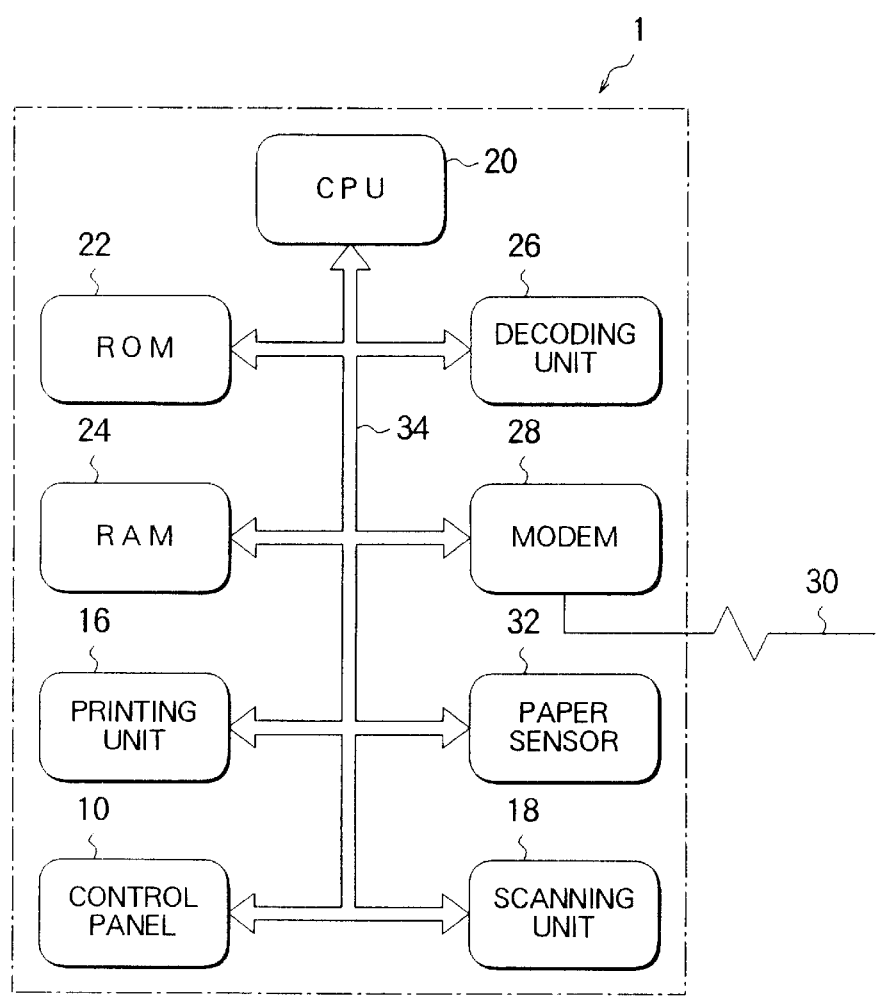
FIG. 2 is a block diagram of the facsimile machine in FIG. 1.

FIG. 2 is a block diagram showing the control panel 10, printing unit 16, scanning unit 18, and other relevant parts of the facsimile machine 1. The facsimile machine 1 has a central processing unit (CPU) 20 such as a microprocessor, a read-only memory (ROM) 22 storing programs executed by the CPU 20, a random-access memory (RAM) 24 storing image data and other data, a decoding unit 26 that decodes coded image data received from other facsimile machines, and a modulator-demodulator or modem 28 that transmits coded image data and control signals on a telecommunication line 30, by modulating the data and signals onto a carrier signal. The modem 28 also receives and demodulates signals from the telecommunication line 30. The CPU 20 and ROM 22 constitute the control unit of the facsimile machine 1.

In addition, the facsimile machine 1 has a paper sensor 32 that senses the presence and absence of printed pages in the stacker 6. The paper sensor 32 comprises, for example, a photodiode that senses reflected light, producing an electrical signal that is on when paper is present and off when paper is absent. Alternatively, the paper sensor 32 may comprise a microswitch, or any other mechanical or optical sensor that produces an on-off signal indicating the presence or absence of paper.

The components shown in FIG. 2 are linked together by a bus 34.

Figure 3:
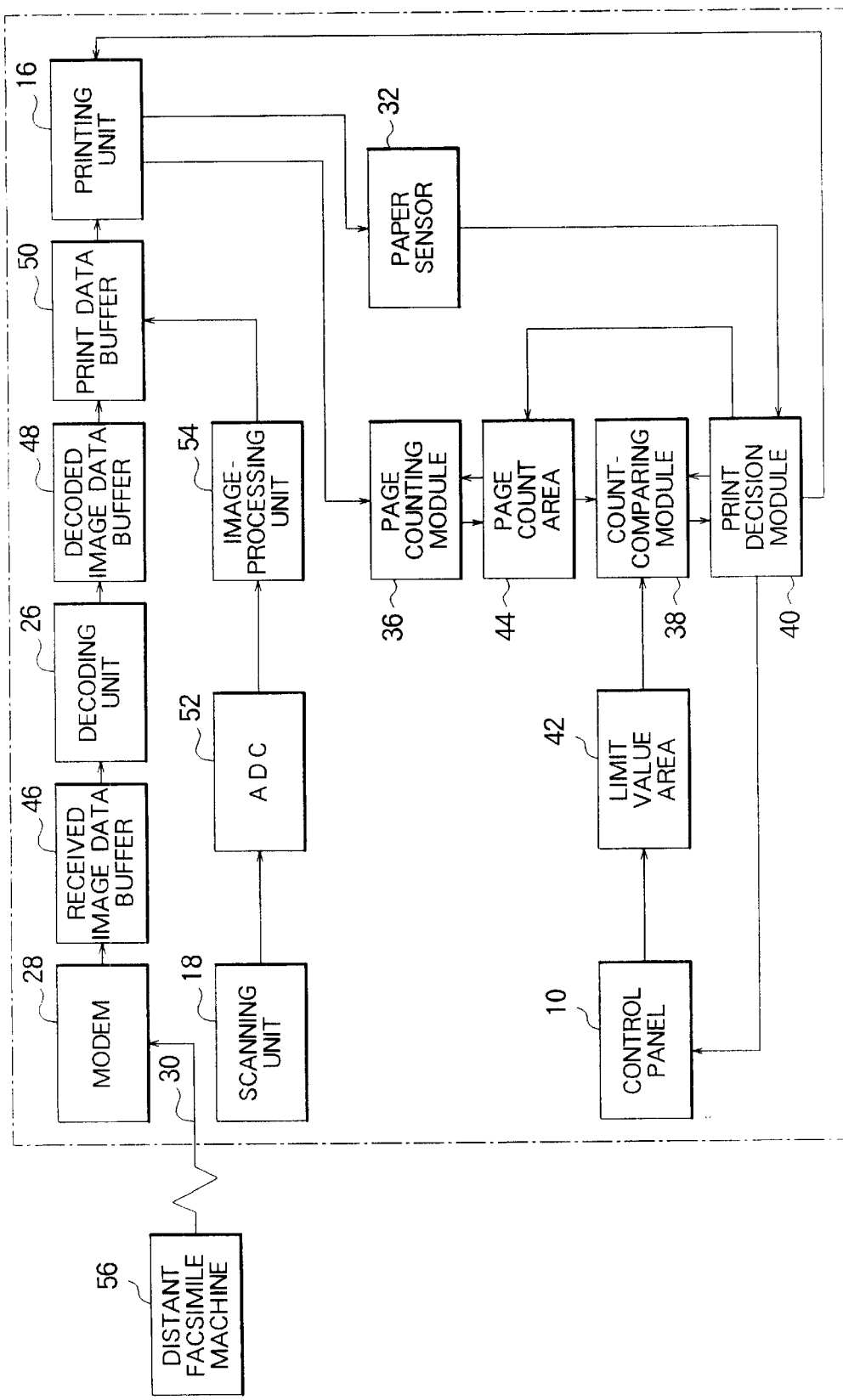
FIG. 3 is a more detailed block diagram of the facsimile machine in FIG. 1.

FIG. 3 is another block diagram showing some of the components shown in FIG. 2, and some additional components, but drawn to indicate the flow of image data and control information. The page counting module 36, count-comparing module 38, and print decision module 40 are program modules stored in the ROM 22. The limit value area 42, page count area 44, received image data buffer 46, decoded image data buffer 48, and print data buffer 50 are storage areas in the RAM 24. The analog-to-digital converter (ADC) 52 and image-processing unit 54 process signals from the scanning unit 18.

Only components associated with the receiving, copying, and printing of image data are shown in the drawings.

Received image data are received from a distant facsimile machine 56 through the telecommunication line 30.

The limit value area 42 stores a limit value indicating the maximum number of pages that can be stacked in the stacker 6. For example, if the stacker 6 can safely stack at most fifty pages, the value stored in the limit value area 42 is fifty. The limit value is preset when the facsimile machine is manufactured, but can be changed by manual operations from the control panel 10. In these operations, a human operator presses buttons to select an item such as 'stacking limit' from a menu, then enters the desired limit value (an arbitrary number n).

The page count area 44 stores a numerical value (j) indicating the number of pages currently stacked in the stacker 6.

The received image data buffer 46 stores coded image data received from the distant facsimile machine 56 through the modem 28. The data are decoded by the decoding unit 26. In the print mode of receiving, the image data are decoded into the decoded image data buffer 48, then moved into the print data buffer 50 and printed by the printing unit 16. In the memory mode of receiving (not indicated by arrows), coded data are stored in the print data buffer 50 for later decoding and printing.

The ADC 52 converts analog signals from the scanning unit 18 to digital signals. The image-processing unit 54 processes the digital signals as representing either bi-level image data or continuous-tone image data, or both. When a document is copied, the image data are placed in the print data buffer 50 to be printed by the printing unit 16.

Each time the printing unit 16 delivers a printed page to the stacker 6, the page counting module 36 is activated. The page counting module 36 reads the current page count (j) from the page count area 44, increments the page count by adding one, and stores the incremented page count in the page count area 44.

The count-comparing module 38 is activated by the print decision module 40. The count-comparing module 38 reads the current page count (j) from the page count area 44 and the limit value (n) from the limit value area 42, compares the two values, and notifies the print decision module 40 of the result of the comparison.

The print decision module 40 uses the result of the comparison to decide whether further pages can be printed, and sends appropriate instructions to the control panel 10 and printing unit 16. The print decision module 40 also receives a signal from the paper sensor 32 indicating whether the stacker 6 contains any stacked pages. When the paper sensor 32 reports that the stacker 6 is empty, the print decision module 40 clears the count (j) in the page count area 44 to zero.

Next, the operation of receiving a facsimile transmission will be described.

In advance of this operation, the limit value (n) stored in the limit value area 42 may be changed from the control panel 10 by menu operations as explained above. Changes made in this way take effect immediately.

The distant facsimile machine 56 initiates the facsimile transmission by dialing the address of the local facsimile machine 1. A switching system in a telecommunication network (not visible) sends ringing signals to the local facsimile machine 1, which answers by closing a switch to form a current loop through the telecommunication line 30. After a well-known handshaking procedure, subsequent operations proceed according to the flowchart in FIG. 4.

First, the CPU 20 executes the print decision module 40, which checks the paper sensor 32 to decide whether paper is present in the stacker 6 (step S1). If the sensor signal is off, indicating that the stacker 6 is empty, the print decision module 40 clears the page count (j) in the page count area 44 to zero (step S2). If the sensor signal is on, indicating the presence of paper in the stacker 6, the count-comparing module 38 is executed to read and compare the page count (j) in the page count area 44 and the limit value (n) in the limit value area 42 (step S3).

If the page count (j) is not equal to the limit value (n) in step S3, or if the page count has been cleared to zero in step S2, the print decision module 40 selects the print mode of receiving (step S4). In this mode, image data are printed as soon as received.

Specifically, the signal transmitted from the distant facsimile machine 56 through the telecommunication line 30 is demodulated by the modem 28, and the coded image data thus obtained are placed in the received image data buffer 46. The decoding unit 26 decodes the data according to standards set by the Telecommunication Standardization Sector of the International Telecommunications Union (ITU-T), and places the decoded image data in the decoded image data buffer 48. From the decoded image data buffer 48, the image data are moved into the print data buffer 50.

The printing unit 16 waits for one page of image data to be received (step S5), then prints the page and delivers the printed page to the stacker 6 (step S6). When the page has been printed, the printing unit 16 notifies the CPU 20, which executes the page counting module 36 to increment the page count (j) in the page count area 44 (step S7).

Next, control signals received from the distant facsimile machine 56 are used to decide whether the facsimile transmission includes further pages (step S8). If there are no more pages, the procedure ends. If there is another page, the procedure returns to step S1 to check the paper sensor 32 again.

After the return to step S1, if the signal from the paper sensor 32 is still on, the count-comparing module 38 compares the new page count (j) with the limit value (n). If the page count has not yet reached the limit value, steps S4 to S8 are carried out to print the next page, increment the page count, and decide whether there are still further pages. Repetition of the loop from step S1 to step S8 continues in this way until the facsimile transmission ends, or until the limit value is reached in step S3.

Figure 4:
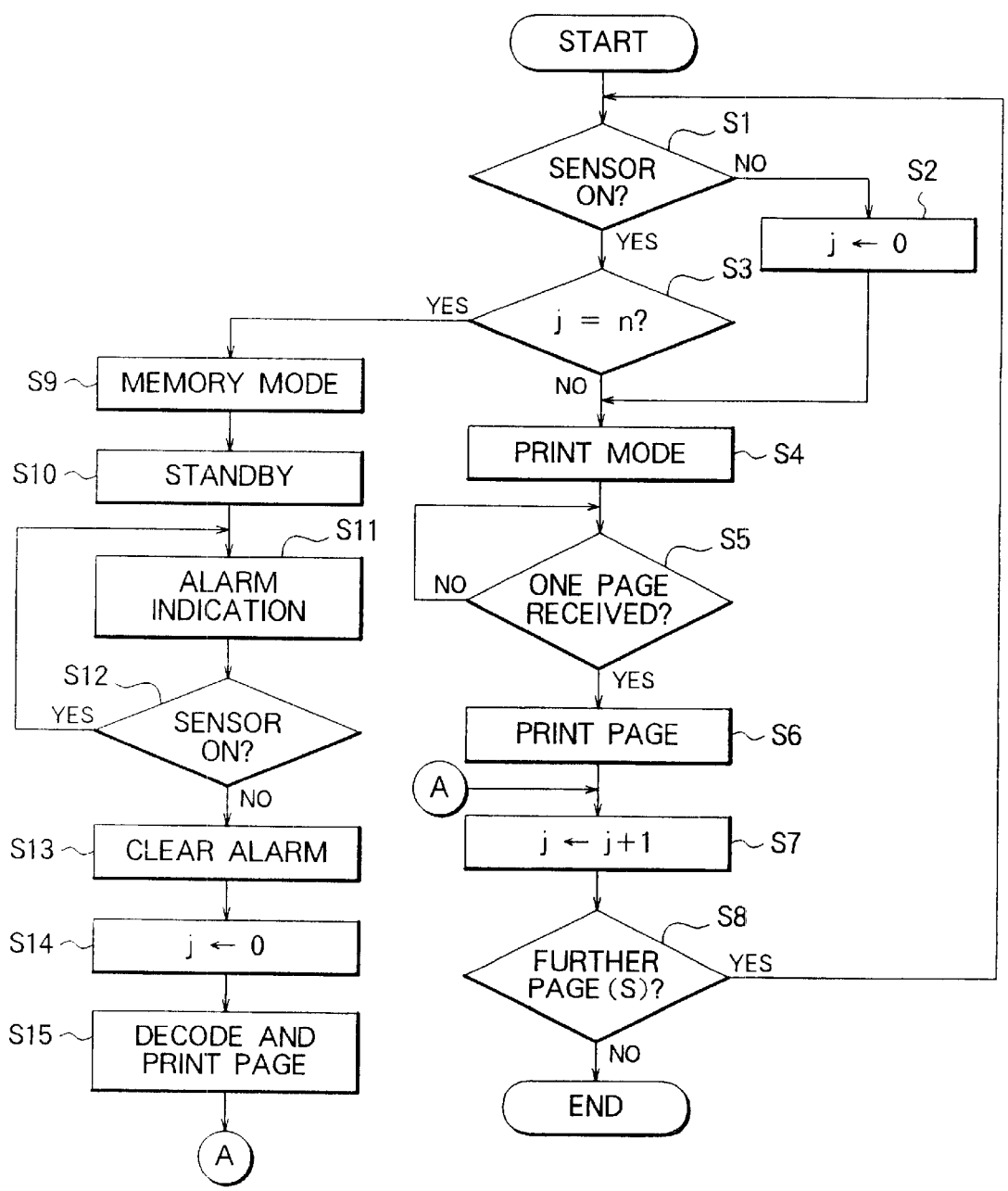
FIG. 4 is a flowchart illustrating the reception of a facsimile transmission.

During the loop from step S1 to step S8, the step of clearing the page count in the page count area 44 to zero is preferably carried out not only at the position shown in FIG. 4, (step S2), but whenever the signal from the paper sensor 32 changes from the on state to the off state. The signal from the paper sensor 32 can be used as a CPU interrupt that activates a count-clearing routine in the print decision module 40, for example. The correct page count is thereby maintained even if the operator removes the printed pages from the stacker 6 while printing is in progress.

If the operator does not remove the printed pages, then as steps S1 to S8 are repeated, the page count (j) may eventually reach the limit value (n). Upon detecting this condition (in step S3), the print decision module 40 selects the memory mode of receiving (step S9). In this mode, the decoding unit 26 and printing unit 16 are placed in a standby state (step S10). Received image data are stored in the print data buffer 50 without being decoded by the decoding unit 26, and for the time being, the coded image data are not printed. Reception in the memory mode continues until the entire facsimile transmission has been received.

The reason for storing coded image data instead of decoded image data is to conserve memory space in the print data buffer 50.

When the entire facsimile transmission has been received, the print decision module 40 gives an alarm indication (step S11), indicating that the stacker 6 needs to be emptied. The alarm indication may take the form of, for example, an audible tone produced from an electronic beeper, a flashing lamp on the control panel 10, a message such as 'Please remove printed pages' indicated on the display 14, or any combination of these indications. The print decision module 40 checks the paper sensor 32 (step S12) and continues to indicate the alarm until the print decision module 40 receives a signal from the paper sensor 32 indicating that all of the printed pages have been removed from the stacker 6.

When this signal is received, that is, when the signal from the paper sensor 32 goes off, the print decision module 40 clears the alarm by turning off the alarm indication or indications (step S13), clears the page count (j) in the page count area 44 to zero (step S14), and directs the decoding unit 26 and printing unit 16 to decode and print the first page stored in the print data buffer 50 (step S15). The procedure then re-enters the loop from step S1 to step S8 at the point (A) between steps S6 and S7. If more than one coded page is stored in the print data buffer 50, the other pages are similarly printed in this loop, step S6 now including both a decoding process and a printing process.

The procedure in FIG. 4 ensures that even when receiving a document by facsimile transmission, the printing unit 16 never attempts to deliver a printed page into a full stacker 6. Paper jams and associated problems are thereby avoided. Furthermore, if the stacker 6 becomes full in the course of a facsimile transmission, the print decision module 40 switches automatically from the print mode to the memory mode of receiving, allowing the facsimile transmission to proceed to completion without inconvenience to the operator of the distant facsimile machine 56. The procedure also avoids inconvenience to the operator of the local facsimile machine 1, by alerting the operator to the stacker-full condition and resuming printing as soon as the operator empties the stacker 6.

Next, the operation of copying a document will be described.

This operation is initiated at the local facsimile machine 1, when the operator places a document on the document table 8 and presses a copy button on the control panel 10. The copy operation then proceeds according to the flowchart in FIG. 5.

First, the print decision module 40 checks the paper sensor 32 (step S21). If the signal from the paper sensor 32 is off, the print decision module 40 clears the page count (j) in the page count area 44 to zero (step S22). If the signal from the paper sensor 32 is on, the count-comparing module 38 reads and compares the page count (j) in the page count area 44 and the limit value (n) in the limit value area 42 (step S23).

If the page count (j) is less than the limit value (n), the scanning unit 18 scans the first page of the document (step S24), converting a reflected light signal from the scanned page to an analog electrical signal. The ADC 52 converts the analog signal to a digital signal, which the image-processing unit 54 converts to image data. The image data are stored in the print data buffer 50 (step S25). The scanned page is fed into the document stacker 12. When the entire page has been scanned, the printing unit 16 prints the image data stored in the print data buffer 50, thereby copying the page, and delivers the printed page to the stacker 6 (step S26).

The page counting module 36 increments the page count in the page count area 44 (step S27); then the print decision module 40 determines whether there are any further pages on the document table 8 (step S28). If there are, the procedure returns to step S21 to scan and copy the next page. If there are no further pages, the procedure ends.

The loop from step S21 to step S28 is repeated until the entire document has been copied, or until the page count (j) reaches the limit value (n) in step S23. During the loop, the step of clearing the page count to zero is preferably carried out not only at the position shown (step S22), but whenever the sensor signal changes from on to off, indicating that the stacker 6 has been emptied.

If the count-comparing module 38 finds (in step S23) that the page count (j) has reached the limit value (n), then the print decision module 40 suspends the copying operation (step S29) and gives an alarm indication (step S30), advising the operator to empty the stacker 6. The alarm indications described earlier can be employed. The print decision module 40 continues to check the paper sensor 32 (step S31) and indicate the alarm (step S30) until the print decision module 40 receives a signal from the paper sensor 32 indicating that the stacker 6 has been emptied by the operator.

When the signal from the paper sensor 32 goes off, the print decision module 40 clears the alarm indication or indications (step S32), clears the page count (j) in the page count area 44 to zero (step S33), then resumes the copying operation by re-entering the loop from step S21 to step S28, at the point (B) between steps S23 and S24.

Figure 5:
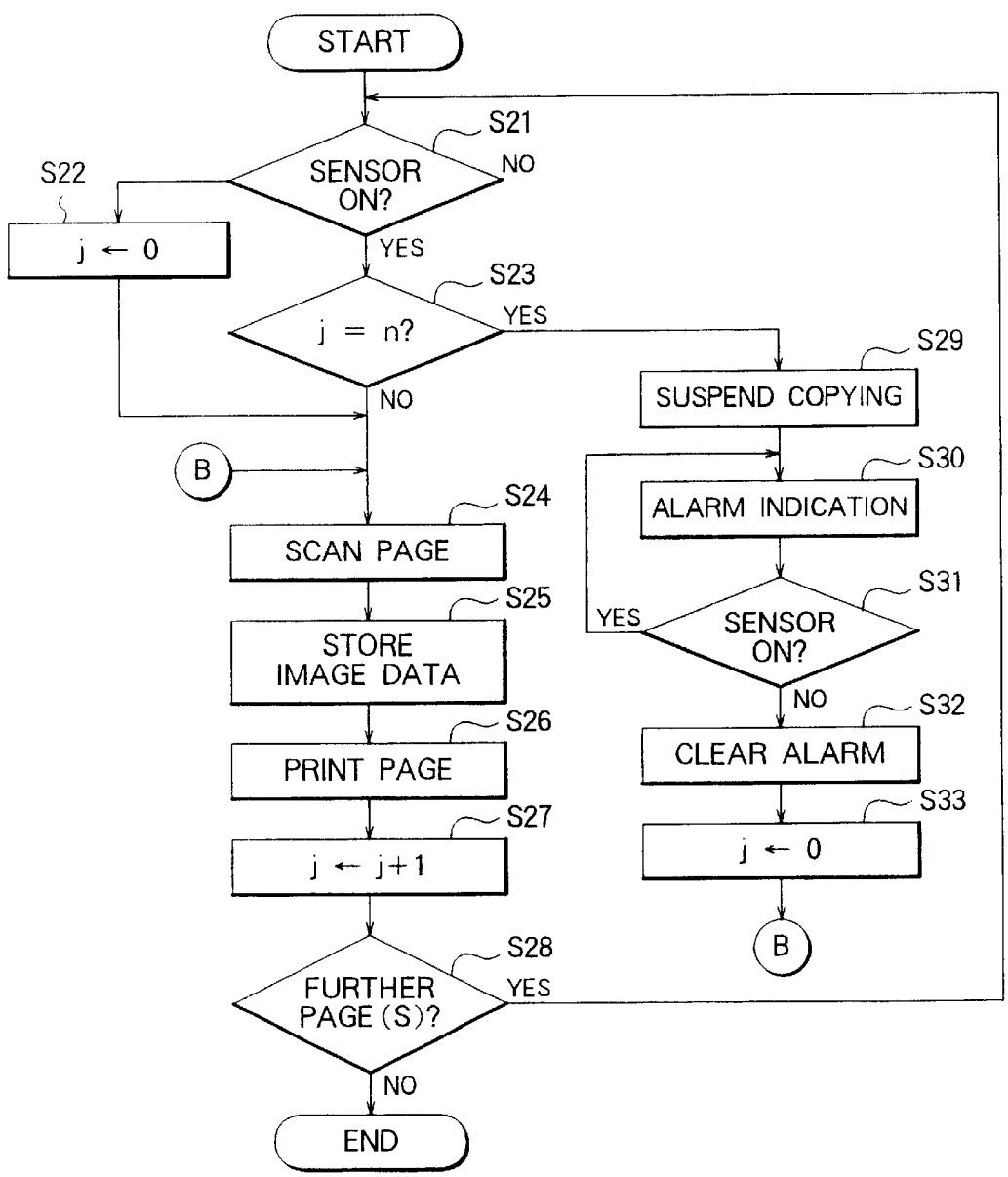
FIG. 5 is a flowchart illustrating a copying operation.

The procedure in FIG. 5 ensures that while copying a document, the printing unit 16 never attempts to deliver a printed page into a full stacker 6. Paper jams and associated problems are thereby avoided.

As the procedure in FIG. 5 does not store more than one page of image data at a time in the print data buffer 50, this procedure can be used in a facsimile machine that does not have a large internal memory and does not support the memory mode of receiving facsimile transmissions.

In both of the procedures in FIGS. 4 and 5, the page count (j) in the page count area 44 remains valid even after the procedure ends. The page count will be read (in step S3 or step S23) at the beginning of the next facsimile reception or copy operation, unless the operator removes the printed pages from the stacker 6 in the meantime.

By suspending printing operations whenever the page count reaches the limit value, the invented facsimile machine avoids the paper jams caused in conventional facsimile machines by the delivery of printed pages to a full stacker.

By giving alarm indications, the invented facsimile machine enables the operator to empty the stacker promptly, so that normal operations can continue without delay.

The invented facsimile machine also relieves the operator of the need to keep track of the status of the stacker. The operator can wait to be notified by the alarm indication, confident that a full stacker will not lead to a paper jam.

By allowing the limit value (n) to be changed from the control panel, the invented facsimile machine enables the operator to set an appropriate limit value according to, for example, the type of paper in the cassette 2.

The loop from step S1 to step S8 in FIG. 4, and the loop from step S21 to step S28 in FIG. 5, can be modified by checking the paper sensor 32 once at the beginning of the loop, then again just before each printed page is delivered into the stacker 6, and clearing the page count if the sensor signal is off at these times.

Those skilled in the art will recognize that further modifications are possible within the scope claimed below.

What is claimed is:

1. A facsimile machine having a stacker, printing image data received from another facsimile machine on pages of paper and delivering the printed pages to the stacker, comprising:

a first memory storing a limit value;

a second memory adapted to store the image data received from said another facsimile machine;

a paper sensor sensing absence of said printed pages in said stacker;

a control unit coupled to said first memory, said second memory, and said paper sensor, counting the printed pages which are delivered to said stacker, thereby maintaining a page count of the number of said printed pages in said stacker, storing the image data received from said another facsimile machine in said second memory when said page count reaches said limit value, and printing the image data stored in said second memory when said paper sensor senses that said stacker is empty.

2. The facsimile machine of claim 1, wherein said control unit also gives an alarm indication, advising a human operator to empty said stacker, when said page count reaches said limit value.

3. The facsimile machine of claim 1, further comprising a control panel with means for setting said limit value.

* * * * *